United States Patent
Thom

(10) Patent No.: US 10,030,982 B2
(45) Date of Patent: Jul. 24, 2018

(54) GENERALISING TOPOGRAPHICAL MAP DATA

(71) Applicant: Ordnance Survey Limited, Southampton, Hampshire (GB)

(72) Inventor: Stuart Thom, Southampton (GB)

(73) Assignee: Ordnance Survey Limited, Southampton, Hampshire (GB)

( * ) Notice: Subject to any disclaimer, the term of this patent is extended or adjusted under 35 U.S.C. 154(b) by 235 days.

(21) Appl. No.: 15/005,071

(22) Filed: Jan. 25, 2016

(65) Prior Publication Data

US 2017/0211941 A1 Jul. 27, 2017

(30) Foreign Application Priority Data

Jan. 26, 2015 (GB) .................................. 1501245.3

(51) Int. Cl.
*G08G 1/123* (2006.01)
*G01C 21/32* (2006.01)

(52) U.S. Cl.
CPC .................................... *G01C 21/32* (2013.01)

(58) Field of Classification Search
CPC ....................................................... G01C 21/32
USPC .......................................................... 701/532
See application file for complete search history.

(56) References Cited

U.S. PATENT DOCUMENTS

| 8,650,193 B1 | 2/2014 | Piloff | |
| 2013/0080594 A1* | 3/2013 | Nourse | G01S 19/14 709/219 |

FOREIGN PATENT DOCUMENTS

| CN | 104077326 A | 10/2014 |
| EP | 0840269 A1 | 5/1998 |

OTHER PUBLICATIONS

Thom, Stuart, "A Strategy for Collapsing OS Integrated Trasnport Network Dual Carriageways," 8th ICA Workshop on Generalisation and Multiple Representation, Jul. 8, 2005.*
Oct. 7, 2016—(EP) Extended Search Report—App 16152611.6.
Luan, Xuechen, et al., "Generating Strokes of Road Networks Based on Pattern Recognition," 13th ICA Workshop on Generalisation and Multiple Representation, Sep. 13, 2010.

(Continued)

*Primary Examiner* — Aaron L Troost
*Assistant Examiner* — Paula L Schneider
(74) *Attorney, Agent, or Firm* — Banner & Witcoff, Ltd.

(57) ABSTRACT

Aspects described herein improve upon systems and methods for generalizing topographical map data relating to the road network for use at different scale levels. Existing systems collapse the two carriageways of a dual carriageway to a single centerline representing the dual carriageway by tracking along one way sections of carriageway and generating pairs of carriageways for collapse, but fall short of being able to compute complicated intersections. Further, existing methods place heavy demands on processing power and are not suitable for change only refreshes. Aspects described herein use graph theory to create a tracked network of stroke type objects representing the length of single carriageway sections of dual carriageways, and then successfully pairs them such that they can be collapsed to a center line and connected to the road network. The process reduces computation time, thereby speeding the rendering process for map imagery.

17 Claims, 14 Drawing Sheets

(56) References Cited

OTHER PUBLICATIONS

Thom, Stuart, "A Strategy for Collapsing OS Integrated Transport Network Dual Carriageways," 8th ICA Workshop on Generalisation and Multiple Representation, Jul. 8, 2005.
Jul. 7-8, 2005—"A Strategy for Collapsing OS Integrated Transport Network dual carriageways"—Stuart Thom—8th ICA Workshop on Generalisation and Multiple Representation.
Jul. 14, 2015—Search Report—App GB1501245.3.

* cited by examiner

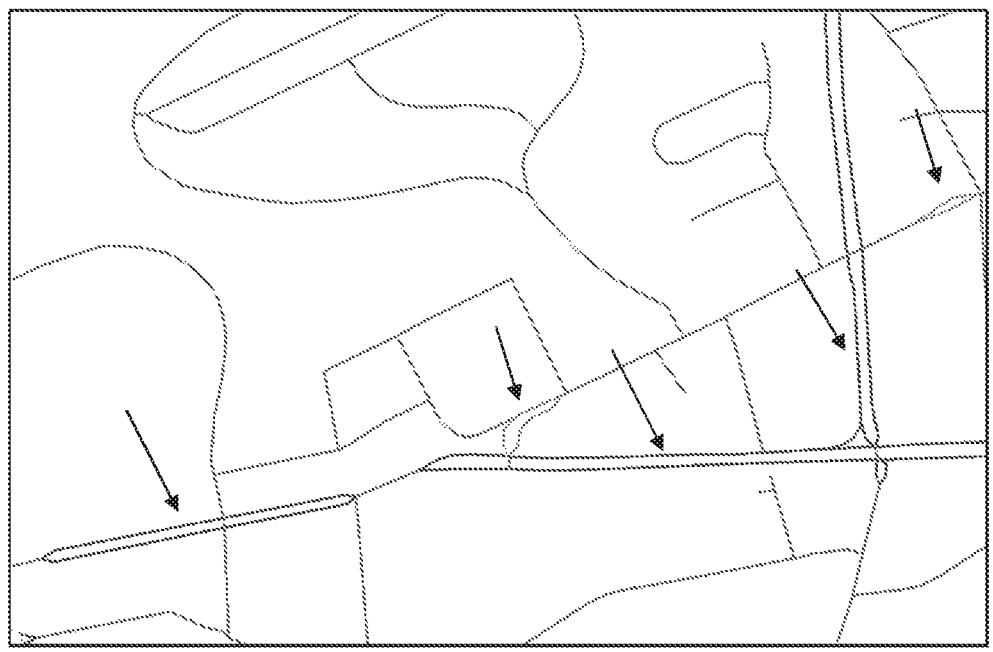
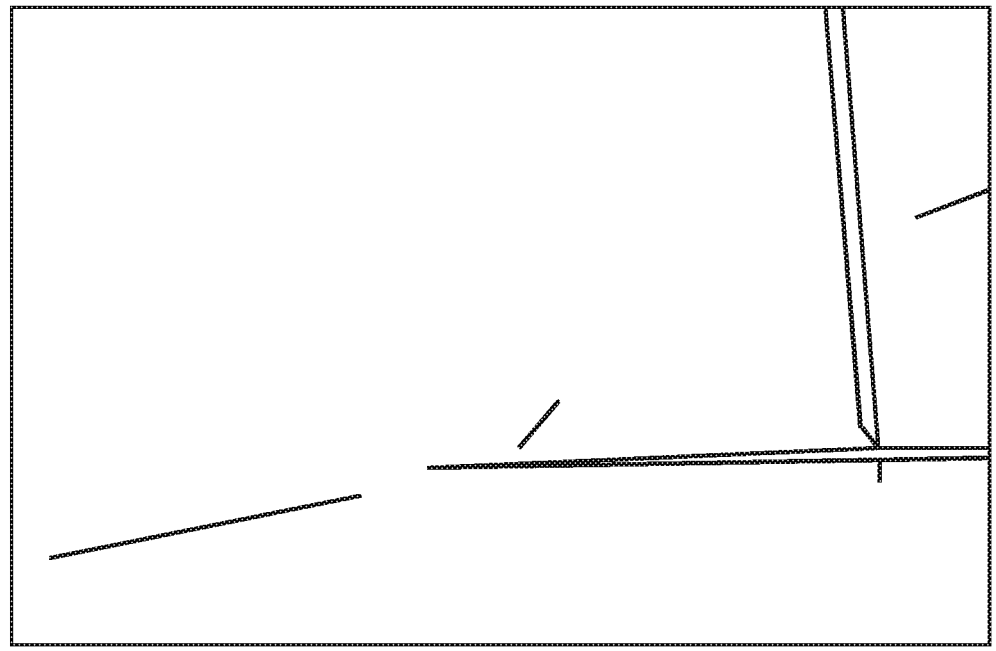
Fig. 4

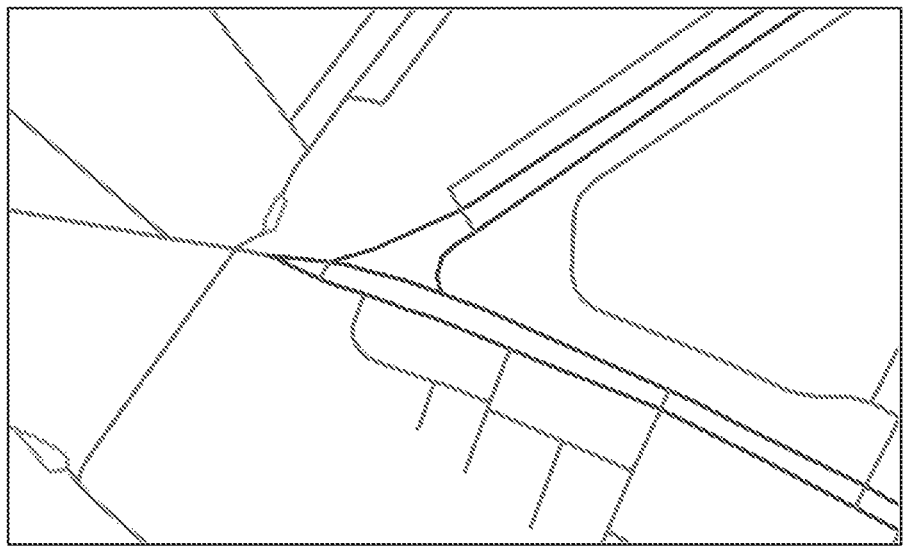
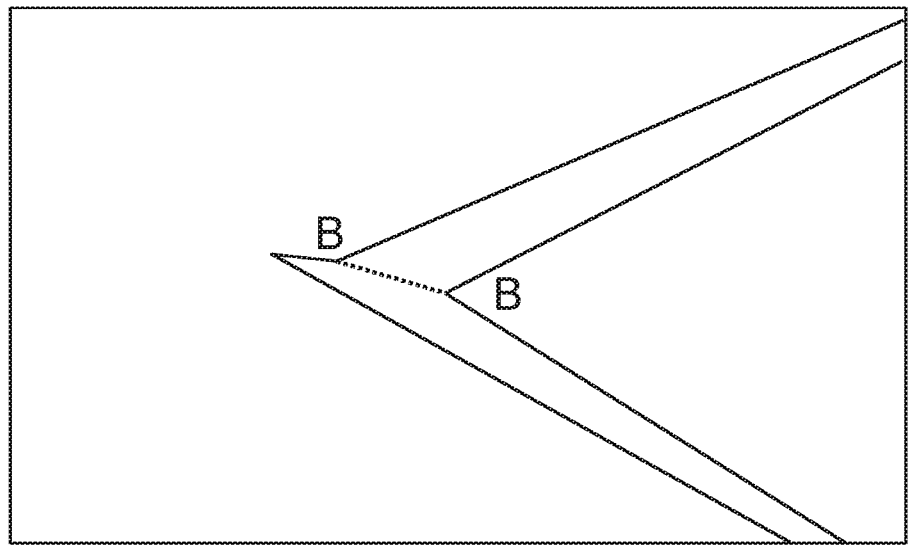
Fig. 8

| Offset | Straddle | Fork |
|---|---|---|
| nodes same type | one type A and one type B | nodes same type |
| nodes share stroke path | nodes do not share stroke path | nodes do not share stroke path |
| | | stroke paths cross |
| nodes do not share spur path | nodes do not share spur path | nodes do not share spur path |
| spur paths do not cross | | |
| spurs and strokes do not share paths | spurs and strokes do not share paths | spurs and strokes do not share paths |
| closer than threshold | closer than threshold | closer than threshold |

Fig. 11

GENERALISING TOPOGRAPHICAL MAP DATA

CROSS-REFERENCE TO RELATED CASES

This application claims priority to UK Application No. 1501245.3 filed Jan. 26, 2015.

TECHNICAL FIELD

Aspects described herein relate to computer implemented methods and systems for generalising topographical map data. In particular, specific aspects relate to computer implemented methods and systems for generating map data relating to the graphical representation of particular roads in dependence on the intended scale of the map data to be displayed.

BACKGROUND

Modern map data has come under increasing demands for rapid generalisation and scalability in the digital age. Where previously a cartographer would draw up a map to a particular scale based on the needs of the user—so that a small scale map would be drawn up for motor vehicle users travelling long distances, and a larger scale map would be created for those travelling on foot—modern users viewing maps on computing devices demand instant scalability of map data. These requirements can pose a number of problems.

Most providers of digital maps rely on a very detailed topographical map database which stores the underlying data. For example, Ordnance Survey uses the very large scale topographic product OS MasterMap®, which records every feature larger than a few meters in one continuous map, and is constantly being updated. Users viewing OS MasterMap® data on a digital device zoom in and out depending on their needs. Rather than draw each zoom level separately and dynamically it is more prudent to create different map images at different zoom levels from the underlying map data in advance. This means that any updates to the underlying data will need to be reproduced at all zoom levels. If a new road is constructed, for example, it would be very time consuming for a technician to have to update multiple zoom versions of the map with the same amendments manually. Raster coverage of Great Britain at 1:50000 was updated manually, and independently of the MasterMap data. OS VectorMap District was the first OS product to be derived automatically from large scale data.

If when creating map images at different zoom levels the underlying data were simply scaled, while retaining all of the data of the underlying map, at a larger scale the map would become unreadable due to the concentration of map features. Therefore generalisation of the features of the map is needed. Generalisation refers to representing concentrations of features as one single feature—for example the individual buildings making up a block in a city will be visible at a high zoom level, but will be viewed as a single entity on a larger scale version of the map.

One of the most widely used aspects of the topographical map data is that of the road network. As an example, the layer of the OS MasterMap which incorporates the topographical road network data is the Integrated Transport Network™ (ITN) layer. The OS model uses a link and node structure that is connected into a single network to depict the road infrastructure in Great Britain. In the context of producing topographic maps, generalisation of the road network is a major task, which requires significant processing of the underlying map data.

To maintain the fidelity of the network, the process of generalising features of the source data which makes up the ITN layer must not lead to the connectivity of roads, paths or junctions being lost. This is important when considering the representation of dual carriageways at an image zoom level where the carriageways are to be represented as one single line.

Dual carriageways (known in the US as divided highways), in which two carriageways separated by a central reservation (or median) are provided for traffic travelling in opposite directions, are represented by two lines in OS large scale road network data, with each line representing a given direction of one way carriageway. This is particularly the case with zoomed-in, large scale map images. For more zoomed-out map images, i.e. smaller scale, which represent a greater geographical area per unit image size, then in order to depict the road with the appropriate symbol, the two lines often need to be merged, or collapsed into a centre line.

A previous solution to this problem was given in the paper "*Strategy for Collapsing OS Integrated Transport Network™ Dual Carriageways*", presented at 8th ICA Workshop on Generalisation and Multiple representation, A Coruña, July 2005 (hereafter the "2005 paper"). The aim of the technique described in the paper was to collapse a dual carriageway to a single centreline representing that dual carriageway. However, the described technique is computationally intensive, and the program was in fact non-scaleable and failed when applied to the entire map database. A less computationally intensive solution, and also one which can be applied only to a subset of map data is therefore desirable.

SUMMARY

Embodiments of the present disclosure aim to improve upon systems and methods for generalising topographical map data relating to the road network for use at different scale levels. The existing systems of the prior art are able to collapse the two carriageways of a dual carriageway to a single centreline representing the dual carriageway for many of the roads of a national road network by tracking along one way portions of carriageway and generating pairs of carriageways for collapse, but fall short of being able to compute complicated intersections. Further, existing methods place heavy demands on processing power. Aspects described herein use graph theory to create a tracked network of stroke type objects representing the length of single carriageway portions of dual carriageways, and then successfully pairs them such that they can be collapsed to a centre line and connected to the road network. The process reduces computation time, thereby speeding the rendering process for map imagery.

According to a first aspect there is provided a method which includes the steps of using a geographic information system to create, by analysing data relating to single direction carriageways contained in a section of existing topographical map data showing a road network, a directed graph of edges and nodes representing said carriageways, and further defining paths through the directed graph, each path representing a portion of a carriageway, and each path comprising: one or more edges of the graph, end nodes; and a unique path identifier. Pairs of paths which represent dual carriageway pairs are defined, and centre lines are created between the paths within dual pairs. The defined dual carriageway paths are merged to respective centre lines which each represent a dual carriageway; and the ends of the centre lines are connected to the road network in the topographical map data to create a collapsed dual map. Merging to centre lines is carried out at points where the distance between paths is below a predefined threshold, the threshold being defined based on the scale of the map to be created. The new map data which is produced is a generalised version of the underlying topographic map data which requires less memory than in previous solutions, produced in a way which minimises processing time, and also results in a map which has fewer errors. The map may be further transmitted across a network connection to user devices requiring less bandwidth than in previous systems According to a second aspect, there is provided a system comprising:
a pairing software module, a collapsing software module; a computer readable map memory module, storing topographic map data including road network data and single carriageway data, a communications interface, and a processor or processors arranged to perform operations. The operations comprise receiving one or more requests for map data from a user device via the communications interface. The processors are further arranged to execute the pairing module to extract the requested map data from the computer readable map memory module, construct a directed graph formed of nodes and edges representing single direction carriageway data in the road network data, define paths corresponding to single carriageways from the edges, define one or more dual carriageway pairs of paths, which represent dual carriageways. Finally the processors are arranged to execute the collapsing module to create a centre line for each dual carriageway pair, merge paths to the centre line at points where the distance between paths is below a predefined threshold. The map server is arranged to create new map data incorporating the created centre-lines and to communicate the new map data to the user device via the communications interface, for display by the user device.

According to a third aspect, there is provided a computing device, comprising: a pairing software module, a collapsing software module; a computer readable map memory module, storing topographic map data including road network data and single carriageway data; a display, arranged to display topographic map data, a graphical user interface, comprising a zoom level controller arranged to control the magnification of the map data displayed on the display, a processor or processors arranged, in use, to perform operations, comprising, in response to a user adjusting the zoom level controller: executing the pairing module to extract the requested map data from the computer readable map memory module, construct a directed graph formed of nodes and edges representing single direction carriageway data in the road network data, define paths corresponding to single carriageways from the edges, and define one or more divided highway pairs of paths, which represent divided highways; and executing the collapsing module to: create a centre line for each divided highway pair, merge paths to the centre line at points where the distance between paths is below a predefined threshold, thereby creating new map data; and displaying the new map data on the display.

Further features and advantages of aspects described herein will be apparent from the appended claims.

BRIEF DESCRIPTION OF THE DRAWINGS

Further features and advantages of aspects described herein will become apparent from the following descriptions of various features, presented by way of example only, and by reference to the drawings, wherein like reference numerals refer to like parts, and wherein:

FIG. 4 is an example of point to point dual carriageways not requiring connection edges;

FIG. 8 is an example of an offshoot edge;

FIG. 11 is a table showing the criteria for each type of topographical edge;

DETAILED DESCRIPTION

A geographic information system (GIS) is a computer system designed to capture, store, manipulate, analyse, manage, and present all types of geographical data. Maps can model the world in more than one way: A topographic map shows the physical surface features, for example, roads, rivers, and buildings, whereas a contour map shows lines which connect point locations at which a certain property has the same value, for example, height above sea level, isobars showing air pressure.

Figure 1:
FIG. 1 is an example map showing the representations of different aspects of a road network.

An example of the representations of different sections of road contained in the topographic data contained in the underlying topographic data of a dataset such as that used in Ordnance Survey's MasterMap® is shown in FIG. 1. Each section of road (an uninterrupted line between two crossing points on the representation, as shown by the arrows in FIG. 1) is attributed with a "nature of road", e.g. single/dual carriageway, traffic island, slip road; and classified as to its function A-road/B-road/dual carriageway etc. These are generally shown in different colours on a representation such as that of FIG. 1. Each section of a dual carriageway (a four lane highway with two lanes travelling in each direction) in the data set, such as those highlighted by the arrows in FIG. 1, can be assigned a one way direction if appropriate.

The underlying dataset from which a new map comprising collapsed dual carriageways will be created has various other attributes important for the collapsing process, such as grade separation (the physical level at which a road joins another section—thereby allowing definition of over/under passes). However, the dataset does not tell the viewer whether two contiguous sections are part of the same road, and it does not contain any dual carriageway "strokes". A "stroke" is the full extent of the dual roads, which will comprise many sections, e.g. the part of the stroke passing from north-west to south-east through FIG. 1, which has 9 sections (indicated by the arrows). Further, the dataset gives no information as to whether parallel sections or strokes of dual carriageway are part of the same road.

Figure 2:
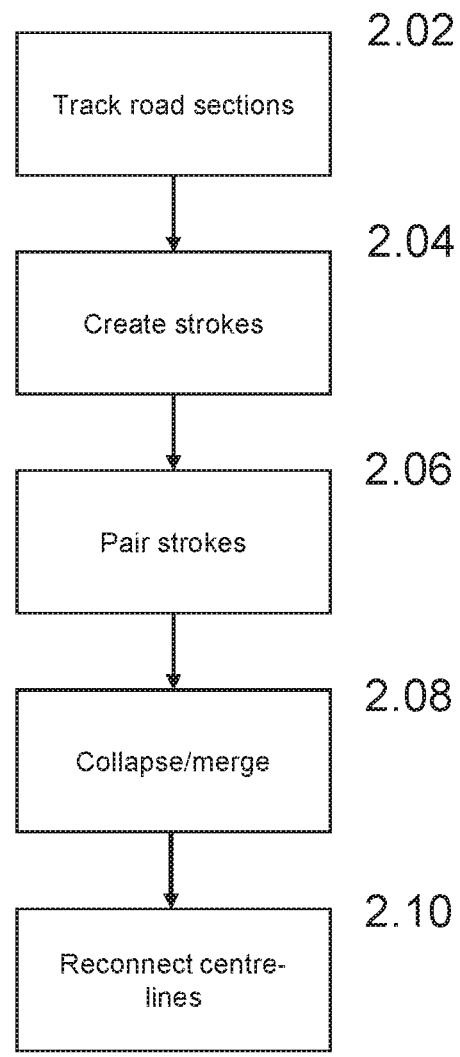
FIG. 2 is a flow chart outlining the main features of dual carriageway collapse.

In order to solve the problem of how to identify corresponding pairs of carriageway strokes in order that they may be collapsed to a centre line, the individual road sections must first be reconstituted to form the strokes, which must then be paired and collapsed, and the ends of the collapsed carriageways must be reconnected in order to create a collapsed dual map which must have the same connectivity characteristics as the underlying topographic data. This process is outlined in FIG. 2, and explained in more detail below.

Forming the strokes of dual carriageway, prior to pairing, requires identifying road sections that form part of the same carriageway. This cannot be done on the basis of straightness of adjacent sections, since slip roads are by design tangential when joining or leaving the carriageway, and false matches are generated.

Strokes are created by tracking the dual attributed sections using only their grade separation, one-way attribution and geometry. To step from one section to another, firstly the grade separation must be the same on the leaving end and the joining start of the two sections. Secondly the one-way direction attribute must be pointing forwards on the two sections. The first stage of tracking is to find the starting span i.e. the first section of this stroke going this (one) way.

Having found a start span one steps forwards down the one-way directed network of duals obeying certain rules until one reaches the end of tracking. The rules specify the choice to make when appraising connecting sections, where the connecting sections are received in clockwise order.

Figure 3:
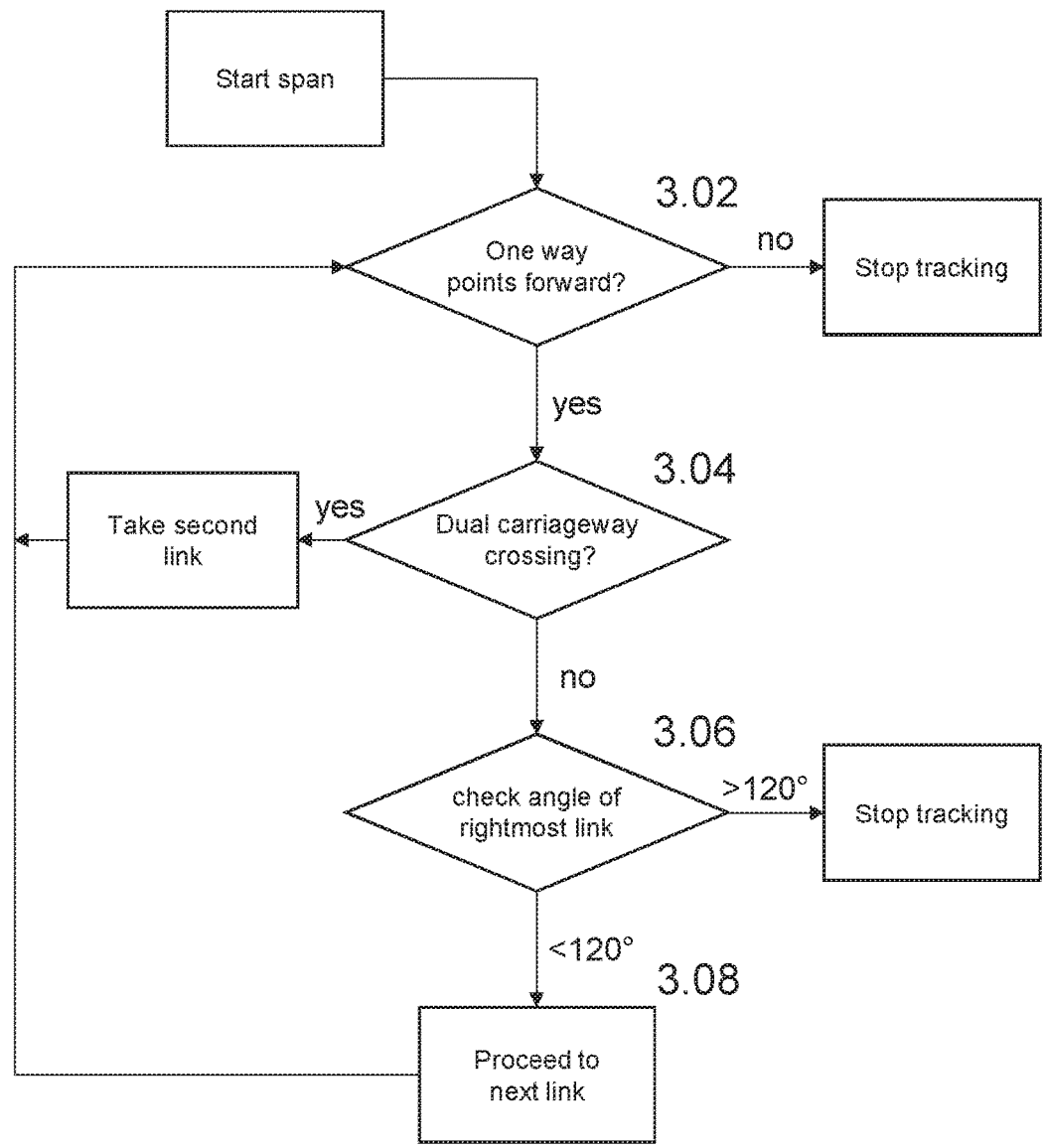
FIG. 3 is a diagram showing the tracking process for producing a dual carriageway stroke.

FIG. 3 shows the process of tracking the sections of the topographic data in order to construct strokes, and the graph which is used for the pairing and collapsing process.

Firstly, in step 3.02, if the one way direction of the next section is the same as the start span, the tracking continues—if not, tracking is ceased and a node is inserted.

If the junction at the road section is a dual carriageway crossing (i.e. a junction with 3 further incoming one-way sections) then the second path is chosen, at 3.04, and the tracking returns to step 3.02. If not a dual carriageway crossing, at step 3.06, the rightmost section is chosen and the angle of intersection tested. If greater than 120° then tracking for the stroke is stopped. If the angle is less than 120° then tracking continues to the next section junction from step 3.02. The rules behind the tracking method can be phrased as: if one were to find the start of a real world dual carriageway and follow it, always taking the right hand fork until one reached the end of the carriageway, such an action would produce a single path.

The road sections, now defined into strokes representing dual carriageways, are placed in a directional graph (known as a di-graph) as they are tracked, where the edges of the graph represent one or more road sections, and the nodes of the graph represent the junctions between them, with additional nodes at junctions with "slip" type road sections. The digraph stores a unique path number for each edge, showing which path it belongs to. Tracking information is also stored on the digraph nodes; a node where a path starts or ends (an "end node") has the type of road stored on it.

From the di-graph it is possible to pair dual paths through the network, which are represented by the graph's edges. In order to reliably pair the dual edges, connection edges are added to the graph, between the end nodes of dual paths. These connection edges are established based on either the distance between nodes, or the topological relationship between nodes and edges.

A real world example of where, on the di-graph a distance edge would be inserted would be between the dual entry point and the dual exit point on a roundabout. It should be noted that once the connection edges are added to the di-graph, it is no longer a pure di-graph, since the connection edges do not have a direction.

FIG. 4 shows a scenario which requires no connection edges to form a collapsible pair of dual edges, since the ends of the dual edges are coincident. The upper part of FIG. 4 shows a sample example of a road network, and the dual edge graph is shown on the lower part. The dual carriageway portions are highlighted with arrows in the example, and it can be seen in the graph that dual edges of this type often obscure their pair. It is a trivial matter to determine that dual edges of this type are a pair, and no connection edges are required.

Figure 5:
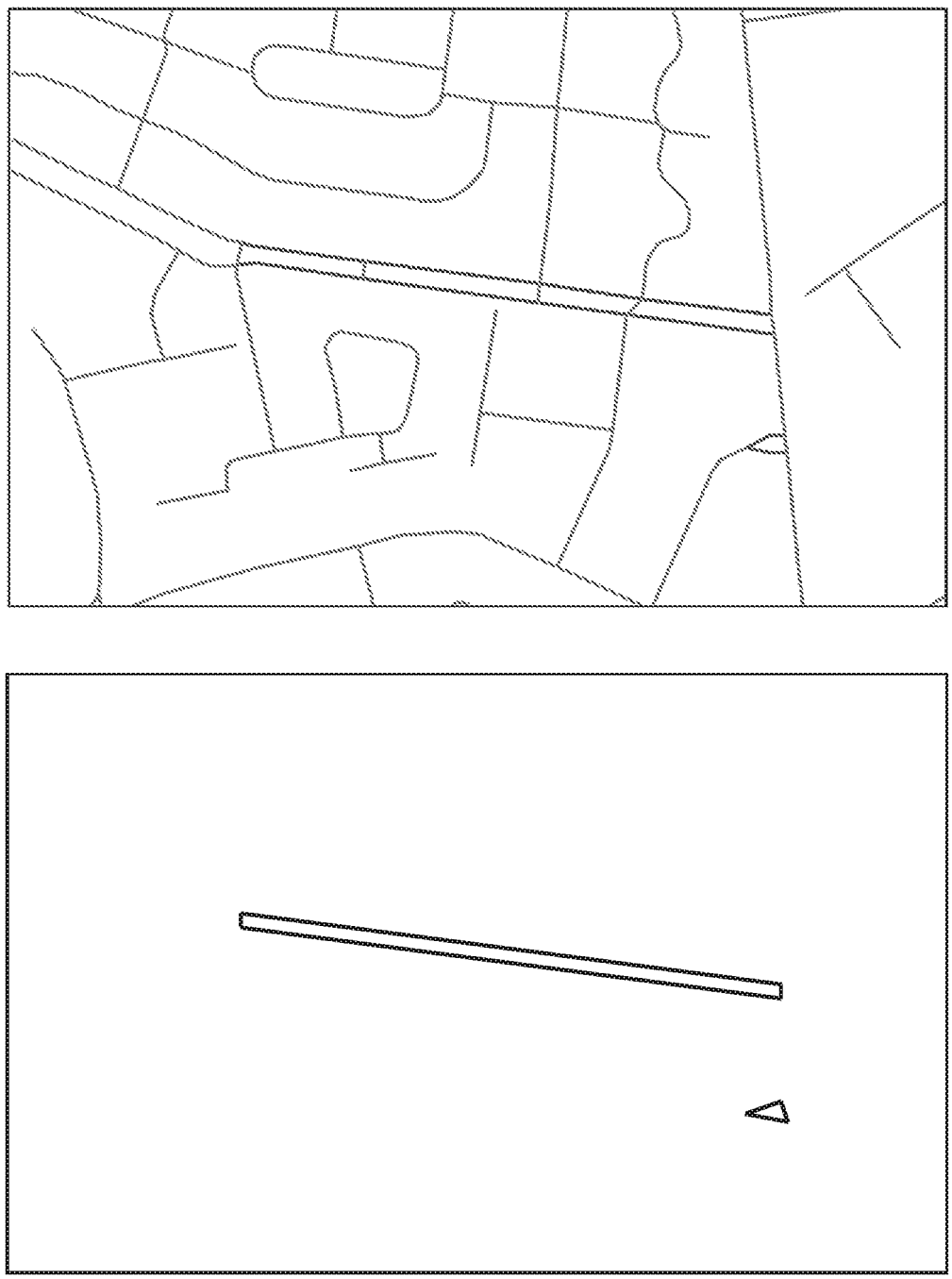
FIG. 5 is an example of a portion of dual carriageway joined by distance connection edges.

FIG. 5 shows a simple example of a dual carriageway identified by the pairing process, with distance edges attached to the ends of the section of dual carriageway.

Figure 6:
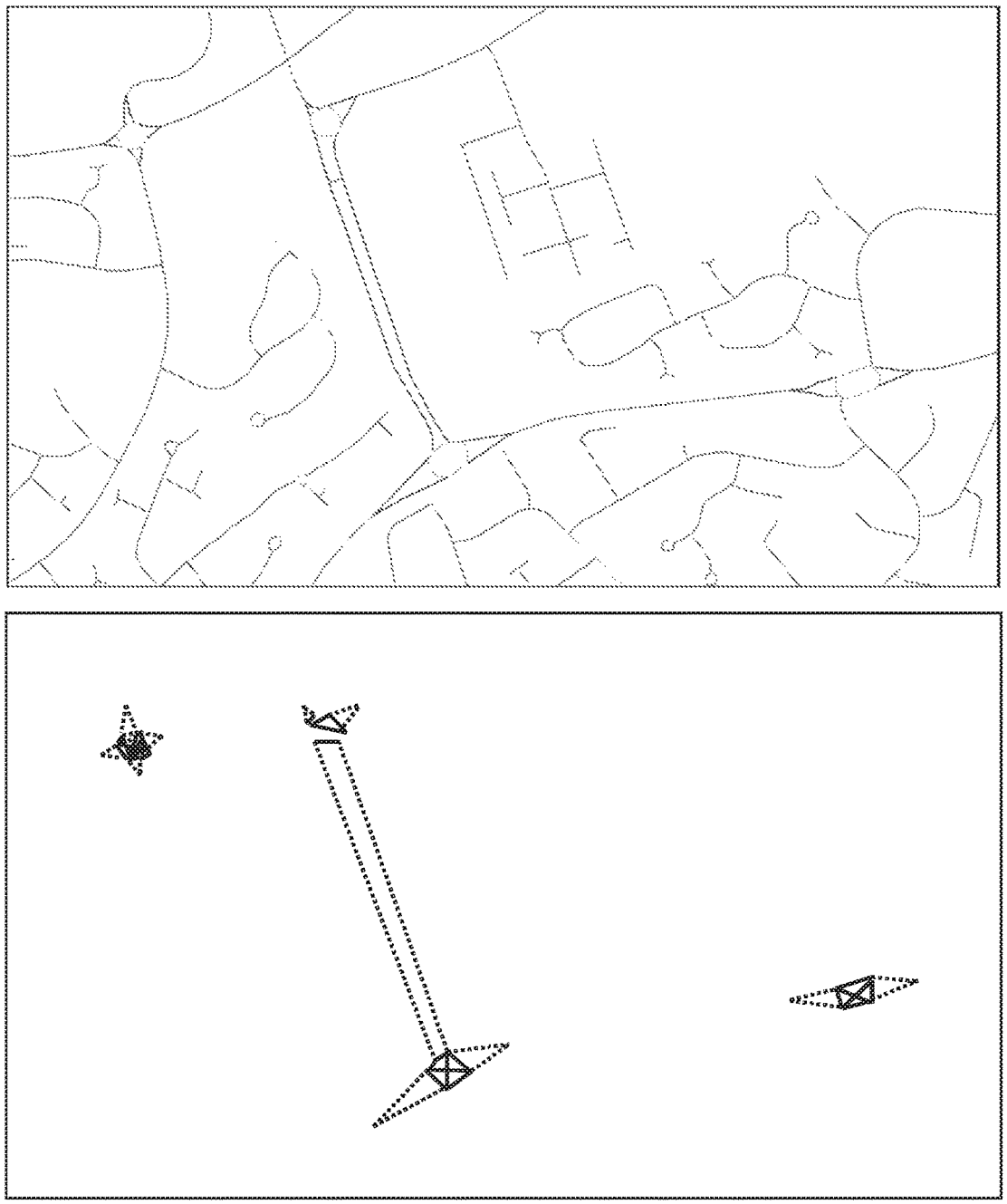
FIG. 6 is an example showing distance edges created at roundabout and box junctions.

Distance edges are added to the graph between any pair of dead end nodes of the graph which satisfy the condition that they are closer than the "distance pairing limit". The value of the distance pairing limit may be changed depending on the situation, but a typical value is 100 m. FIG. 6 shows an example of distance edges applied to the di-graph at the ends of a section of dual carriageway, the strokes of which can be seen as dashed lines. It can be seen in FIG. 6 that distance edges have been added which join all points of a roundabout and all points of a box junction, since the end nodes all satisfy the distance pairing limit. This means that there are substantially too many distance edges. This problem is solved by giving each distance edge a weighting, based on its length. The process of sorting distance edges is further described below.

Figure 7:
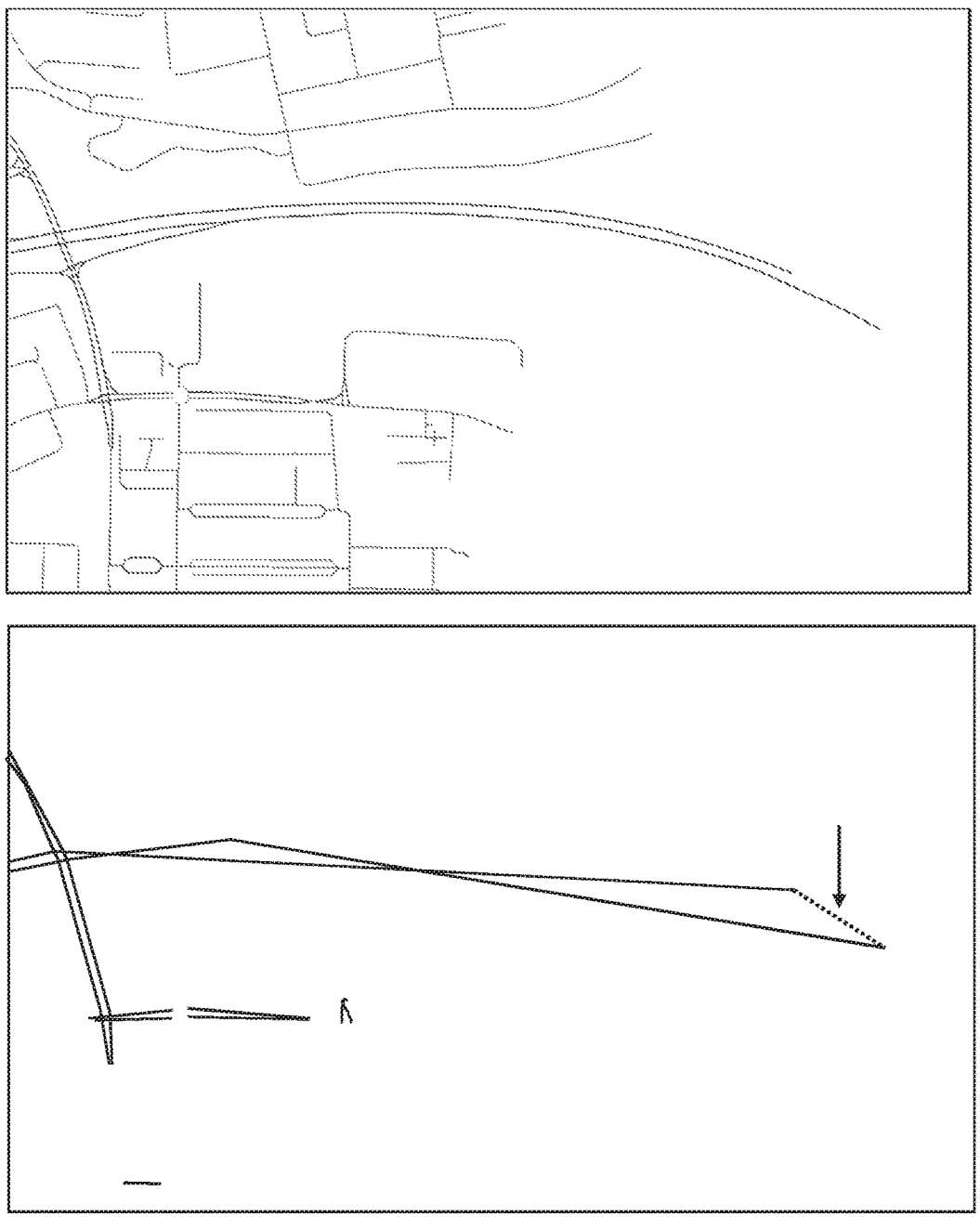
FIG. 7 is an example of a selection of map data which requires an open distance edge

Once distance edges have been added to the graph, the graph is then reprocessed for any dead end nodes which satisfy the "open pairing limit". This is a distance which is set greater than the distance pairing limit, in order that dual carriageways which may have been truncated at the edge of a selected area are paired. Dead end nodes which satisfy the open pairing limit are joined be an "open edge" connection. An example of an open edge connection at the edge of a selected area of the road network can be seen in FIG. 7; the open edge is denoted by the arrow.

Once the graph has been processed to add distance and open edges, it remains to construct topographical connection edges between remaining nodes on the di-graph. The nature of the dual carriageway network is such that it gives rise to many spur branch points, that is, nodes which have three dual edges—most commonly at a point where a slip road enters or exits the carriageway. The spur branch point has three dual edges, two of which share the same path number. These nodes will be end nodes of a spur path, and will also be interior nodes of a common path (the carriageway which continues on to terminate at a further node). Two types of node are defined; if a spur path crosses its common path then it is a type A node, else it is a type B node.

There are three types of topological end connection, two of which resemble dual carriageway T junctions and a third which is more like a Y junction. Offshoot and Straddle junctions (seen in FIG. 8 and FIG. 9) comprise one dual which is clearly continuous through the junction, whereas in a Fork junction this is not always the case.

Figure 9:
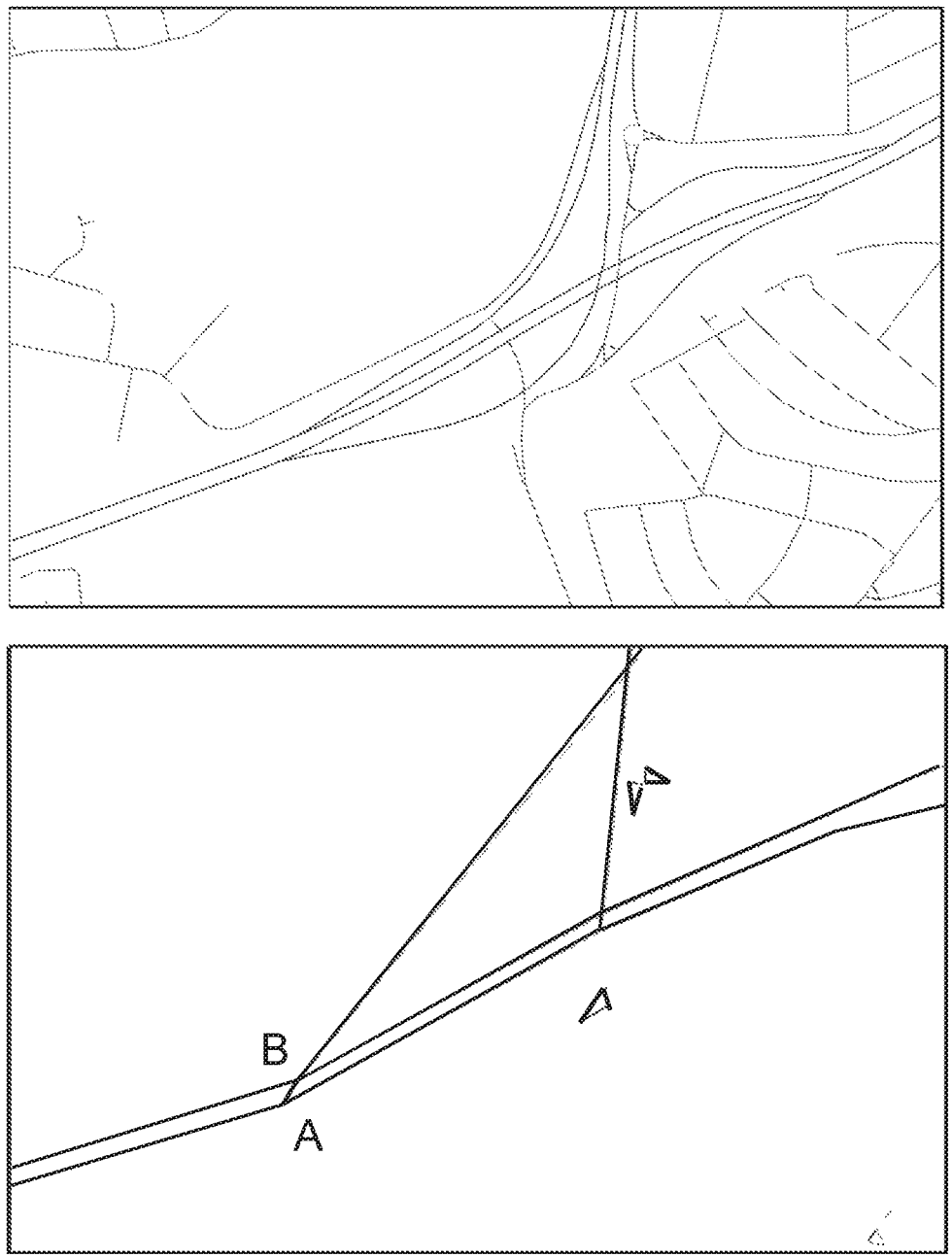
FIG. 9 is an example of a straddle edge.

In the straddle junction shown in FIG. 9 the arrowed edge represents two superimposed dual edges.

The rules which apply to the application of the different topographical connection edges are shown in FIG. 11. For the edges shown in FIGS. 8 and 9, it can be seen that the offshoot triple edge nodes are both type B (since they do not cross the common path), for the straddle, one is type A and the other is type B, while for a fork junction the situation is more complicated. If the nodes found satisfy the conditions laid out in the table in FIG. 11 then they are inserted into the graph, provided that they satisfy pre-defined limits of inter-node distance. If inter-node distance of either the Offshoot edge limit (for offshoot edges) or the straddle edge limit (for straddle edges) is exceeded then the connection edges will not be inserted into the graph.

The process steps of pairing the dual carriageways which have been connected by connection edges according to an aspect is now described.

The process steps through each of the nodes on the graph which match a specific start condition. The start conditions are: a point having two or more dual edges, wherein the dual edges have unique path numbers, or a connection edge.

Where the start match is a point, the process attributes a pair to any paths joined by a distance edge.

Where the start match is an edge, a number of different terminations of the paths are available. If the paths are connected by a distance edge, which have nodes that have a unique path number, the paths are followed to the end end node—if the two ends ore also joined by a connection edge, then a candidate pair has been found. If more than one candidate pair is found, then a comparison is made of the connection edge weights—the smallest connection edge weight is retained as the successful pair.

Where the start match is an offshoot or distance connection edge, starting from those edges with the smallest weighted value (i.e. the shortest), if both nodes have an edge with a unique path number, those paths are followed to the end. If these two paths terminate at nodes which are also joined by a connection edge then the paths are a pair.

Figure 12:
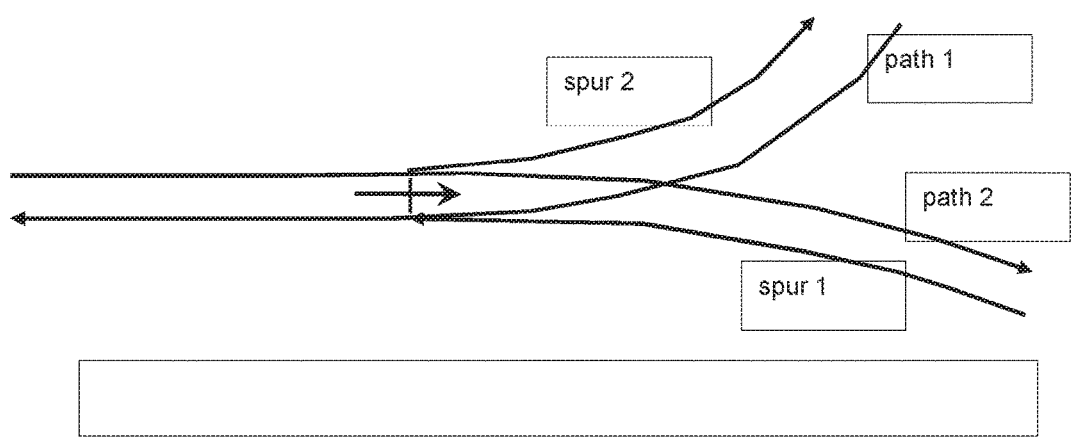
FIG. 12 is a simplified diagram of a fork edge.

If the start match is from a fork connection edge, the process will only pair part of a path, as can be seen in FIG. 12. Firstly a list of fork edges is created. The spur paths are followed to the end, and the common path is followed to both its ends to check for a point or connection edge at the termination of the spur path and common path which signifies a match.

Figure 10:
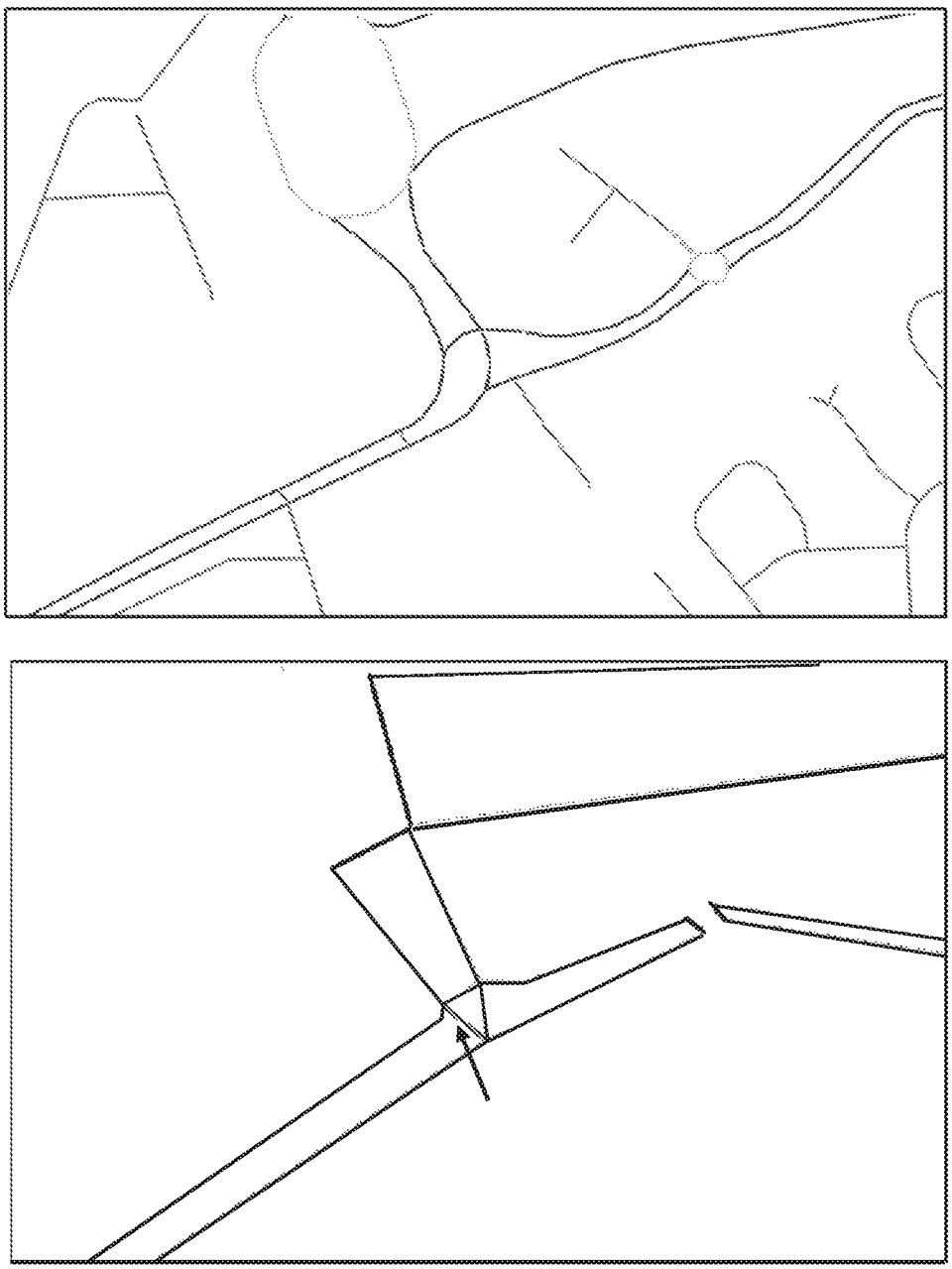
FIG. 10 is an example of a fork edge.

The direction in which matches are found is shown by the arrow above the fork edge in FIG. 10. The paths from the fork edges' nodes along spur2 and path1 are followed to their ends, and checks are made for point or edge connection. The process is repeated for spur1 and path2. When matching a fork connection it is expected that two pairs will be found. If only one pair matches, then an attempt to retrace the path that failed is attempted. This may be done by overwriting the path number of the failed path with that of the successful spur branch of the successful pair.

Each time a pair is detected, there are several steps to take before moving on to repeat the process to look for the next pair. If a successful pair had connection ends (i.e. all non 'coincident end connection' ends) other connection edges attached to the connections' nodes are removed. All the dual edges the paths ran through are removed from the graph. If either end of the pair was a distance connection edge, they are removed from the graph too. If either end of the pair were a topological connection edge, they are left in the graph. This ensures that the stalk of the fork (i.e. the part to the left of the arrow in FIG. 10), after its two forward pairs have been matched and removed, will be able to match using the retained fork connection edge.

The above processes detect successful pairs of dual carriageways which a candidates for collapsing to a centre line. They can be broken into a four phase sequence as described below.

Figure 13:
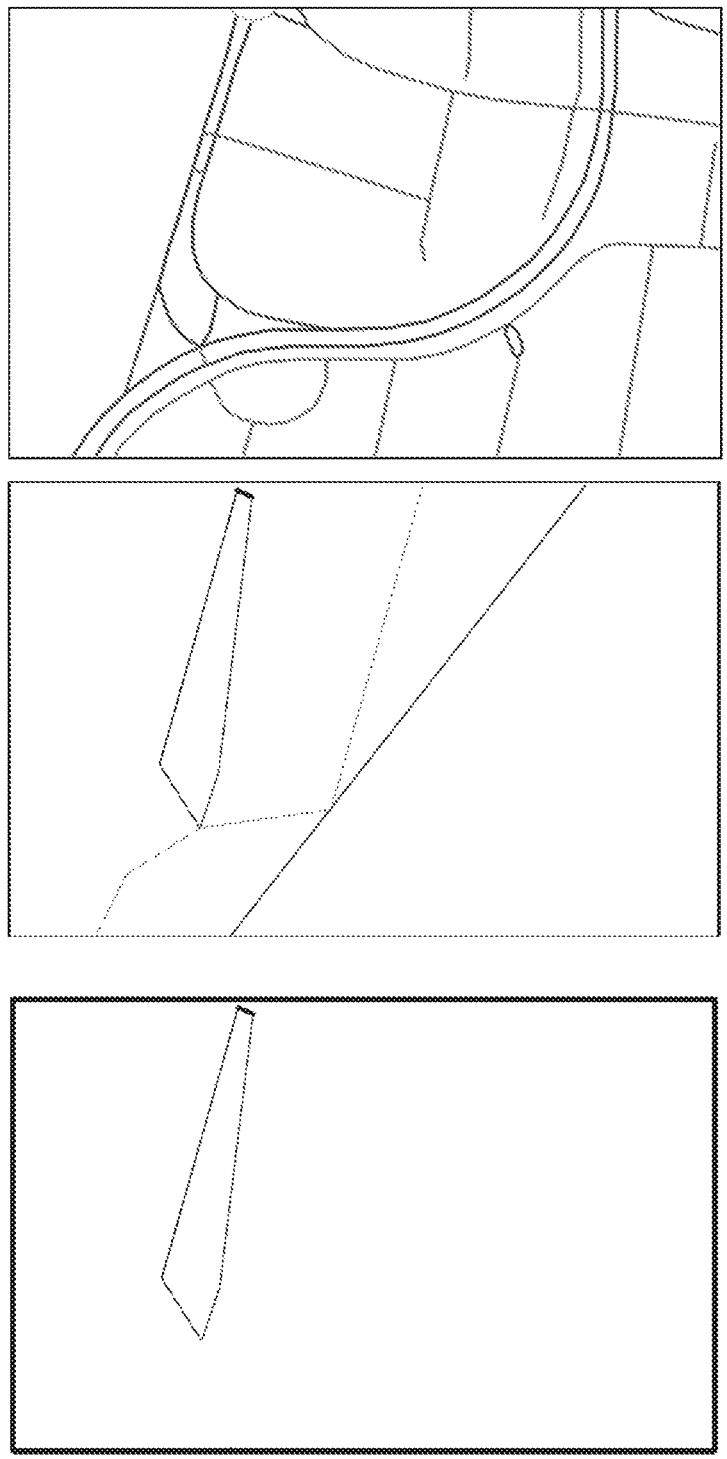
FIG. 13 shows the production of a graph and the results from different phases of processing.

Phase one will remove all the straightforward pairs from the graph as follows
Detecting point===>point
Detecting point===>connection edge
ignore fork edge when testing for connection
suppress match if paths cross
Detecting connection edge===>connection edge
distance edges only
Detecting offshoot or distance connection edge===>connection edge
ignore fork edge when testing for connection
suppress match if paths cross
Phase two explores matches from the fork edges.
Detecting fork connection edge===>point or connection edge
Phase three picks up matches exposed by earlier solutions. At this stage the restriction
where fork edges are ignored when selecting connection edges is removed.
Detecting point===>connection edge
Detecting connection edge===>connection edge
Detecting offshoot or distance connection edge===>connection edge
Phase four also picks up matches exposed by earlier solutions
Recreate distance edges. Since some new dead end nodes (connected to only one edge) will have been exposed when matched duals are removed from the graph in previous phases, we need to re run the matching algorithms. The distance limit is doubled too (if this were done on the complete graph prior to successful matching of a significant number of the dual pairs there is a significant risk of memory overflow). The start and finish dead end nodes exposed during phases one to three are tested against the original finish and start dead end nodes creating some more distance edges. They are not tested against each other as this would put distance edges where they are not wanted.
Detecting point===>point
Detecting point===>connection edge
Detecting connection edge===>connection edge An example of a point end being exposed is shown in FIG. 13. The sample of the road network is shown in the uppermost panel. The central panel shows the di-graph that is constructed by tracking along dual sections. The lower panel shows the graph after phases one, two and three have been created. It can be seen that the node that is arrowed in the central panel will not be picked up as a start match in the first passes, since there is a path which passes through it. Once the pair running through the middle of the graph has been removed, the node at the base of the remaining edges is exposed. Phase four will take the graph in the lower panel and produce a pair.

Figure 14:
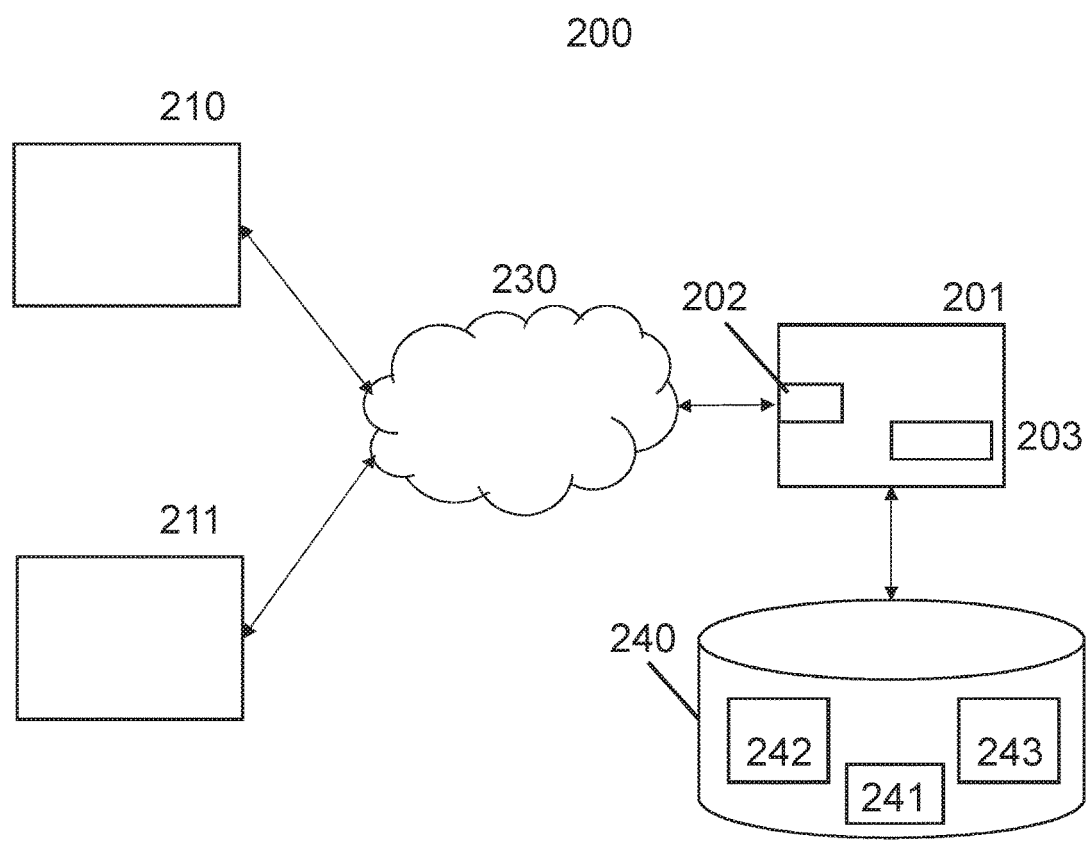
FIG. 14 is a system diagram showing a system in which one or more aspects described herein may be carried out.

A system showing an example of an implementation of one or more aspects described herein is shown in FIG. 14. Generally, the system described below implements the various steps and processes described in detail above, and hence reference should be made to the above when considering the various steps and processes described below.

With reference to FIG. 14 system 200 comprises a map server 201 in communication with user devices 210, 211 via network 230 through a communications interface 202. Map server 201 comprises a processor 203 arranged to carry out computing operations, and is also in communication with core server 240. The core server 240 runs different software implemented modules which carry out different tasks or provide particular data when required by processor 203. More specifically, master map module 241 contains the large scale topographic data. Pairing module 242 is present to carry out the steps necessary to create matching pairs of carriageways which correspond to dual carriageways. The collapsing module 243 is arranged to take the pairs of carriageway strokes defined by the pairing module and collapse them to centre lines. Map server 201 can effectively serve as a map generator in response to requests received from user devices which require a selected portion of the large scale topographic map data at a zoom level, or resolution, which requires the collapsing of dual carriageways to be displayed on the user device. That is to say that when a user selects zoom level which is lower than a threshold at which the underlying topographical data can be displayed on the display of the device, be it due to display size, or the required resolution of the displayed map data, a request for a collapsed dual map may be sent from the user device. The request is sent during the process of "zooming out" from a small scale map display to a large scale map.

The topographic data contained in the Master map module 241 is used by the other modules in the core server to raster a map at the scale defined in a user request to the map server 101.

In one embodiment, map server 201 is arranged to receive requests via network 230 from user device 210, 211 to provide map data at a specific resolution or zoom level. User devices 210, 211 may be computing devices, including but not limited to tablet devices, desktop computing devices or mobile telecommunications devices.

The user devices 210, 211 may be provided with a Graphical User Interface (GUI) which in turn is provided with a map portion selection controller and a zoom level selection controller. The zoom level controller may be in the form of a slider operable over a range of discrete zoom levels to display map data between a maximum zoom level and a minimum zoom level, or may be in the form of a pair of zoom in and zoom out controls. The user employs the level controllers to input a selection of the desired location and zoom level that is required. The use of the map portion selection controller and zoom level controller can cause the communication of a user request to the map server when the user selects a portion of the map comprising dual carriageways satisfying a predefined condition or zoom level reaches a predetermined threshold. For example, when the user reaches a zoom level low enough that the two lines of the dual carriageway are required to be overlaid on the displayed map, the collapse of the carriageways is required. The communication of a user request from the user device 210,211 to the map server 201 may initiate the creation of a new map comprising collapsed dual carriageways.

Map server 201 communicates the specific nature of the request to the core server 240, which extracts the relevant parts of the topographic map data required from the Master map module 241.

Pairing module 242 is arranged to carry out the following processes upon the topographic map data extracted from master map module. Broadly speaking, a directed graph is constructed, to which further edges are added. Using the characteristics of the further edges pairs of edges in the graph can be identified as belonging to a dual carriageway pair, and collapsed to a centre line, which is then reconnected to the road network represented in the master map data. This generalisation of small scale features allows for the accurate representation of the network when represented on maps at scales larger than that of the master map data.

Master map data contained in module 241 is a topologically structured road line network, as described above. The Pairing module operates on one-way road sections of type "Dual Carriageway", and others, contained in the master map data. They are placed in a directional graph in which the edges represent one or more road sections, and the nodes represent the junctions between these three road types, with additional nodes at slip type junctions. The directional graph stores a unique path identifier against each edge showing which path it belongs to. Tracking information is also retained on the digraph nodes; a node where a path (or paths) starts or ends (an end node) has the type of road stored in it. A path through the graph is found by following edges through the graph with the same path identifier from a start end node to an end end node.

To sort out the paired dual paths it is necessary to add a second type of edge to the graph to connect pairs of paths. These edges are added to the directional graph between the end nodes of pairs of paths, depending on proximity of the nodes, and the topographical nature of the edges connected to the nodes.

The pairing module 242 iteratively removes pairs of paths having connection edges of different types from the graph, along with their connecting edges, and subsequently reprocesses the graph to determine if further edges can be inserted to pair newly exposed candidate nodes.

The collapsing module then operates on the pairs of paths removed from the graph and represents the carriageways identified by the pairing process and removed from the graph in a single centreline. The collapsing to the centre line is carried out based on a number of parameters. At different map scales, dual carriageways will still be represented as separate paths on a map if the distance between them exceeds a specified value. At low zoom levels, the single carriageways of the dual carriageway will be displayed as a single collapsed line where the distance between the carriageways is below a predefined threshold set for the particular zoom level selected.

The centre-lines representing the dual carriageways can then be automatically reconnected to the underlying topographical data to form a new map layer, which can be easily scaled without the need for further generalisation of dual carriageways.

The map data created when the collapsed dual carriageway data has been reconnected to the topographic data can then be communicated to user devices 210, 211, for display at different zoom levels.

Alternatively, the user device can be loaded with data which has been prepared in the manner described above for a particular area, such that the use of a zoom control does not instantiate the request for new data from the server. The user device instead sends a request when map data for a new location is requested by a user. The transport network layer is updated and the method outlined above is performed when a change is made to the master map data.

Upon receipt of a user request for data relating to a new location, the map server provides the user device with the data for the request location at the different zoom levels, which encompass levels at which the dual carriageways are collapsed and levels at which they are not collapsed.

A user device may be provided which has the local capacity to carry out the steps above. The user device comprises a display, arranged to display topographic map data, a graphical user interface comprising a zoom level controller arranged to control the magnification of a map displayed on the display. Pairing and collapsing software modules may be provided on the user device, as well as a computer readable map memory module, storing the topographic map data which includes road network data and single carriageway data. A processor is provided on the user device which, in response to adjustment of the zoom level controller by a user which would require the overlay of single carriages in the map display, is arranged to execute the pairing and the collapsing module, as described above, to create new map data comprising collapsed dual carriageway data. The newly created collapsed carriageway data is displayed on the display.

One or more aspects described herein may use the deconstruction of map layer features and reconstruction into a di-graph which is analysed in a particular manner, including the creation and addition of further edges into the di-graph. The pairing of paths through the di-graph is thus rendered more effective and less processor intensive and has the result that a large map dataset can be rendered faster and with fewer errors.

The method and system described above may be configured to automatically carry out the steps above for creating the collapsed dual carriageway map data upon the registering or recording of a change to the topologically structured road line network contained in the topographic master map, and thereby remove the cognitive analysis and decision making of a human operator. Such an update, following the construction of a new road or intersection is registered by the change being saved in the main topographic map data. The collapsed dual map is created as above. The update to the layer including the collapsed dual carriageway data is applied only to the area containing the change, and the change is pasted into the existing dataset without the need for a full re-rendering of the dataset. When an update is applied to the layer, when existing centrally on the map server, the method can automatically be implemented and the updated transport layer information and collapsed dual map update is then pushed out to user devices as required.

Various modifications, whether by way of addition, deletion and/or substitution may be made to the above described embodiment to provide further embodiments, any and/or all of which are intended to be encompassed by the appended claims.

The invention claimed is:

1. A method comprising:
   creating, by analysing geographic information system data relating to single direction carriageways contained in a section of existing topographical map data showing a road network, a directed graph of edges and nodes representing said carriageways,
   defining paths through the directed graph, each path representing a section of a carriageway, and each path comprising:
      one or more edges of the graph,
      end nodes; and
      a unique path identifier;
   identifying the pairs of paths which represent dual carriageway pairs;
   creating centre lines between the paths within dual carriageway pairs;
   merging the defined dual carriageway paths to respective centre lines which each represent a dual carriageway; and
   connecting the ends of the centre lines to the road network in the topographical map data to create the map as a collapsed dual map;
   wherein:
   the identifying further comprises:
      inserting one or more connection edges into the directed graph to connect respective end nodes of a pair of paths in dependence on the proximity of the end nodes and the topographic nature of the edges of the paths, and
      iteratively removing pairs of paths having connection edges from the directed graph, the one or more pairs of paths representative of dual carriageway pairs being identified based on pairs of paths having nodes connected by connection edges and removed from the directed graph;
   the creating centre lines further comprises representing the pairs of paths having connection edges and removed from the directed graph as a centre line;
   the merging is performed based on the centre lines created for the pairs of paths having connection edges, wherein merging is carried out at points where the distance between paths is below a predefined threshold, the threshold being defined based on a scale of a map to be created; and
   the connecting of the centre lines creates a new scalable map layer for display at different zoom levels.

2. The method of claim 1, wherein inserting edges comprises first inserting edges between pairs of nodes each connected to only one edge, wherein the condition that the inter-node distance is smaller than a first predefined limit is satisfied.

3. The method of claim 2, wherein inserting edges further comprises inserting edges linking pairs of nodes connected to only one edge in which the inter-node distance does not satisfy the first predefined limit, but satisfies a second predefined limit.

4. The method of claim 1, wherein inserting edges further comprises:
   defining triple edge nodes that have three edges, two of which share a path identifier and define a common path, as belonging to a first type or second type, wherein the first type has a third edge which crosses the common path, and the second type has a third edge which does not cross the common path; and
   inserting edges between nodes of the same first or second type wherein the internode distance satisfies a third predefined limit, and the shared path identifier is the same at both nodes of a pair.

5. The method of claim 4, further comprising:
   inserting edges between pairs of nodes, wherein the pairs include a node of the first type and a node of the second type, and the inter-node distance satisfies a fourth predefined limit, and the shared path identifier is different at each of the nodes in a pair.

6. The method of claim 1, wherein creating the directed graph is carried out in response to a change being registered in the topographical map data.

7. A system, comprising:
   a communications interface;
   one or more processors arranged to control operation of the system; and
   memory storing topographic map data including road network data and single carriageway data, and further storing computer readable instructions which, when executed by the one or more processors, configure the system to perform:
      receiving one or more requests for map data from a user device via the communications interface;
      executing a pairing module to:
         extract the requested map data from the computer readable map memory module, construct a directed graph formed of nodes and edges representing single direction carriageway data in the road network data,
define paths corresponding to single carriageways from the edges, and
identify one or more dual carriageway pairs of paths, which represent dual carriageways; and
executing a collapsing module to:
create a centre line for each dual carriageway pair,
merge paths to the centre line at points where the distance between paths is below a predefined threshold;
generating new map data incorporating the created centre-lines; and
sending, via the communications interface, the new map data for transmission to the user device, for display by the user device;
wherein:
the pairing module is further configured when executed to:
create connection edges within the graph between respective end nodes of pairs of paths in dependence on the proximity of the end nodes and the topographic nature of the edges of the paths, the one or more dual carriageway pairs of paths being identified based on pairs of paths having nodes connected by connection edges; and
iteratively remove the pairs of paths having connection edges from the directed graph;
the collapsing module is further configured when executed to:
represent the pairs of paths having connection edges and removed from the directed graph as a centre line; and
merge the centre lines created for the pairs of paths having connection edges at points where the distance between paths is below a predefined threshold; and
wherein the generating of the new map data further includes automatically connecting the centre lines to the topographic map data to create a new scalable map layer for display at a different zoom level.

8. The system of claim 7, wherein the pairing module is arranged to create connection edges within the graph between end nodes of pairs of paths.

9. The system of claim 7, wherein the pairing module is arranged to create connection edges based on the proximity of end nodes in the graph.

10. The system of claim 7, wherein creating connection edges further comprises:
defining triple edge nodes that have three edges, two of which share a path number and define a common path, as belonging to a first type or second type, wherein the first type has a third edge which crosses the common path, and the second type has a third edge which does not cross the common path; and
inserting edges between nodes of the same first or second type wherein the internode distance satisfies a third predefined limit, and the shared path number is the same at both nodes of a pair.

11. The system of claim 10, wherein creating connection edges further comprises:
inserting edges between pairs of nodes, wherein the pairs include a node of the first type and a node of the second type, and the inter-node distance satisfies a fourth predefined limit, and the shared path identifier is different at each of the nodes in a pair.

12. The system of claim 7, further comprising a user device arranged to display map data, the user device comprising:
a graphical user interface having a zoom selection tool for selecting a zoom level, wherein the user device is arranged to send a request for map data when the zoom selection tool is adjusted to display a zoom level lower than a predetermined threshold, and further arranged to display the new map data created by the map server.

13. The system of claim 7, wherein the operations of the pairing module and the collapsing module are executed in response to a change being registered in road network data of the stored topographic map data.

14. A computing device, comprising:
one or more processors controlling operations of the device;
a display, arranged to display topographic map data and a graphical user interface; and
memory storing topographical map data including road network data and single carriageway data, and further storing computer readable instructions which, when executed by the one or more processors, configure the device to perform:
displaying the graphical user interface comprising a zoom level controller arranged to control the magnification of the map data displayed on the display;
in response to receiving user input adjusting the zoom level controller:
executing a pairing module to:
extract the requested map data from the computer readable map memory module,
construct a directed graph formed of nodes and edges representing single direction carriageway data in the road network data,
define paths corresponding to single carriageways from the edges, and
identify one or more divided highway pairs of paths, which represent divided highways; and
executing a collapsing module to:
create a centre line for each divided highway pair, and
merge paths to the centre line at points where the distance between paths is below a predefined threshold, thereby creating new map data; and
displaying the new map data on the display;
wherein:
the pairing module is further configured when executed to:
create connection edges within the graph between respective end nodes of pairs of paths in dependence on the proximity of the end nodes and the topographic nature of the edges of the paths, the one or more dual carriageway pairs of paths being identified based on pairs of paths having nodes connected by connection edges; and
iteratively remove the pairs of paths having connection edges from the directed graph;
the collapsing module is further configured when executed to:
represent the pairs of paths having connection edges and removed from the directed graph as a centre line; and
merge the centre lines created for the pairs of paths having connection edges at points where the distance between paths is below a predefined threshold; and wherein the creating of the new map data further includes automatically connecting the centre lines to the topographic map data to create a new scalable map layer for display at a different zoom level.

15. The computing device of claim 14, wherein inserting edges comprises first inserting edges between pairs of nodes each connected to only one edge, wherein the condition that the inter-node distance is smaller than a first predefined limit is satisfied.

16. The computing device of claim 14, wherein inserting edges further comprises inserting edges linking pairs of nodes connected to only one edge in which the inter-node distance does not satisfy the first predefined limit, but satisfies a second predefined limit.

17. The computing device of claim 14, wherein inserting edges further comprises:
   defining triple edge nodes that have three edges, two of which share a path identifier and define a common path, as belonging to a first type or second type, wherein the first type has a third edge which crosses the common path, and the second type has a third edge which does not cross the common path; and
   inserting edges between nodes of the same first or second type wherein the internode distance satisfies a third predefined limit, and the shared path identifier is the same at both nodes of a pair.

* * * * *